(12) United States Patent
Park (10) Patent No.: US 9,725,123 B2
(45) Date of Patent: Aug. 8, 2017

(54) COMMON JIG APPARATUS FOR MOUNTING FENDER OF MULTIFARIOUS VEHICLE

(71) Applicants: Hyundai Motor Company, Seoul (KR); Kia Motors Corporation, Seoul (KR)

(72) Inventor: Joon Seo Park, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 564 days.

(21) Appl. No.: 14/449,664

(22) Filed: Aug. 1, 2014

(65) Prior Publication Data

US 2014/0338180 A1   Nov. 20, 2014

Related U.S. Application Data

(62) Division of application No. 13/075,726, filed on Mar. 30, 2011, now Pat. No. 8,826,506.

(30) Foreign Application Priority Data

Dec. 1, 2010   (KR) ........................ 10-2010-0121089

(51) Int. Cl.
*B25B 11/00* (2006.01)
*B62D 65/02* (2006.01)

(52) U.S. Cl.
CPC ....... *B62D 65/026* (2013.01); *Y10T 29/49998* (2015.01); *Y10T 29/53943* (2015.01); *Y10T 29/53961* (2015.01); *Y10T 29/53974* (2015.01)

(58) Field of Classification Search
CPC ... B23Q 1/03; B23Q 1/25; B23Q 1/52; B23Q 1/74; B23Q 3/00; B23Q 3/06; B25B 11/00
See application file for complete search history.

(56) References Cited

U.S. PATENT DOCUMENTS 6,533,260 B1 * 3/2003 Mock ........................ B66F 7/22
254/133 R
7,926,797 B2 * 4/2011 Sorenson ............. G02B 6/4475
269/138

(Continued)

FOREIGN PATENT DOCUMENTS

CN          2860720 Y    1/2007
CN        201505868 U    6/2010

(Continued)

*Primary Examiner* — Lee D Wilson
(74) *Attorney, Agent, or Firm* — Mintz Levin Cohn Ferris Glovsky and Popeo, P.C.; Peter F. Corless (57) ABSTRACT

The present invention provides a common fender mounting jig apparatus for use with multifarious vehicles including a plurality of common clamping units for clamping fender panels of multifarious vehicles by using, selectively, a plurality of fixing blocks processed in compliance with the shape of a fender panel associated with each vehicle model. Additionally, the common fender mounting jig may also include a clamp movement unit for moving the common clamping unit upwardly and downwardly, forwardly and backwardly; a fender mounting jig mounted on its upper face with the common clamping unit and loading the fender panel clamped by the common clamping unit on a body-in-white; and a jig movement unit for moving and rotating the fender mounting jig. By using only one common clamping unit, the present invention is able to comply with various shapes of fender panels of multifarious vehicles.

5 Claims, 10 Drawing Sheets

(56) References Cited

U.S. PATENT DOCUMENTS

| | | | | |
|---|---|---|---|---|
| 8,205,312 B2* | 6/2012 | Simmons | ............... | B23K 31/12 |
| | | | | 29/281.1 |
| 8,596,627 B2* | 12/2013 | Lands | ................... | B25H 1/0007 |
| | | | | 254/2 B |
| 8,601,670 B2* | 12/2013 | Sorenson | ............. | G02B 6/4475 |
| | | | | 269/45 |
| 2003/0051328 A1 | 3/2003 | Song | | |
| 2009/0245930 A1 | 10/2009 | Baulier et al. | | |
| 2012/0137503 A1* | 6/2012 | Park | ..................... | B62D 65/026 |
| | | | | 29/559 |
| 2014/0338180 A1* | 11/2014 | Park | ..................... | B62D 65/026 |
| | | | | 29/559 |

FOREIGN PATENT DOCUMENTS

| | | | |
|---|---|---|---|
| JP | 04331009 | A | 11/1992 |
| JP | 06246507 | A | 9/1994 |
| JP | 2008-006866 | A | 1/2008 |
| KR | 10-0286123 | | 3/1999 |
| KR | 10-1999-0060732 | A | 7/1999 |
| KR | 10-0282474 | B1 | 11/2000 |
| KR | 10-2002-0083221 | A | 11/2002 |
| KR | 10-2003-0006061 | A | 1/2003 |
| KR | 10-0792891 | | 1/2008 |
| WO | 2009-049200 | A1 | 4/2009 |
| WO | 2009049200 | A1 | 4/2009 |

\* cited by examiner

Cross sectional view along B-B

FIG. 7

Cross sectional view along C-C

FIG. 10

COMMON JIG APPARATUS FOR MOUNTING FENDER OF MULTIFARIOUS VEHICLE

CROSS-REFERENCE TO RELATED APPLICATION

This application is a Divisional Application of U.S. patent application Ser. No. 13/075,726, filed Mar. 30, 2011, which claims under 35 U.S.C. §119(a), the benefit of Korean Patent Application No. 10-2010-0121089 filed Dec. 1, 2010, the entire contents of which are incorporated herein by reference.

BACKGROUND (a) Technical Field

The present invention relates to a common jig apparatus for mounting fenders of multifarious vehicles. More particularly, it relates to a common fender mounting jig apparatus for multifarious vehicles that is capable of responding to various fender panel shapes of multifarious vehicles.

(b) Background Art

Body in white or BIW refers to the stage in automotive design or automobile manufacturing process in which a car body's sheet metal components have been welded together but the removable parts (e.g., doors, hoods, and deck lids as well as fenders the motor, chassis sub-assemblies, or trim (glass, seats, upholstery, electronics, etc.) have not been added and the vehicle has not been painted.

During this process, panels of a body-in-white for forming a vehicle body are manufactured in a press process, and conveyed to the body-in-white assembling factory to be assembled onto a vehicle body. The assembled body-in-white is mounted with appearance panels which include the door trunk lid, the hood, fender or the like, and then conveyed to a painting process to be painted.

Next, the vehicle is processed in a trim line, where various kinds of auto parts including the engine, the transmission, and the interior and exterior materials are assembled to form one complete vehicle.

Figure 1:
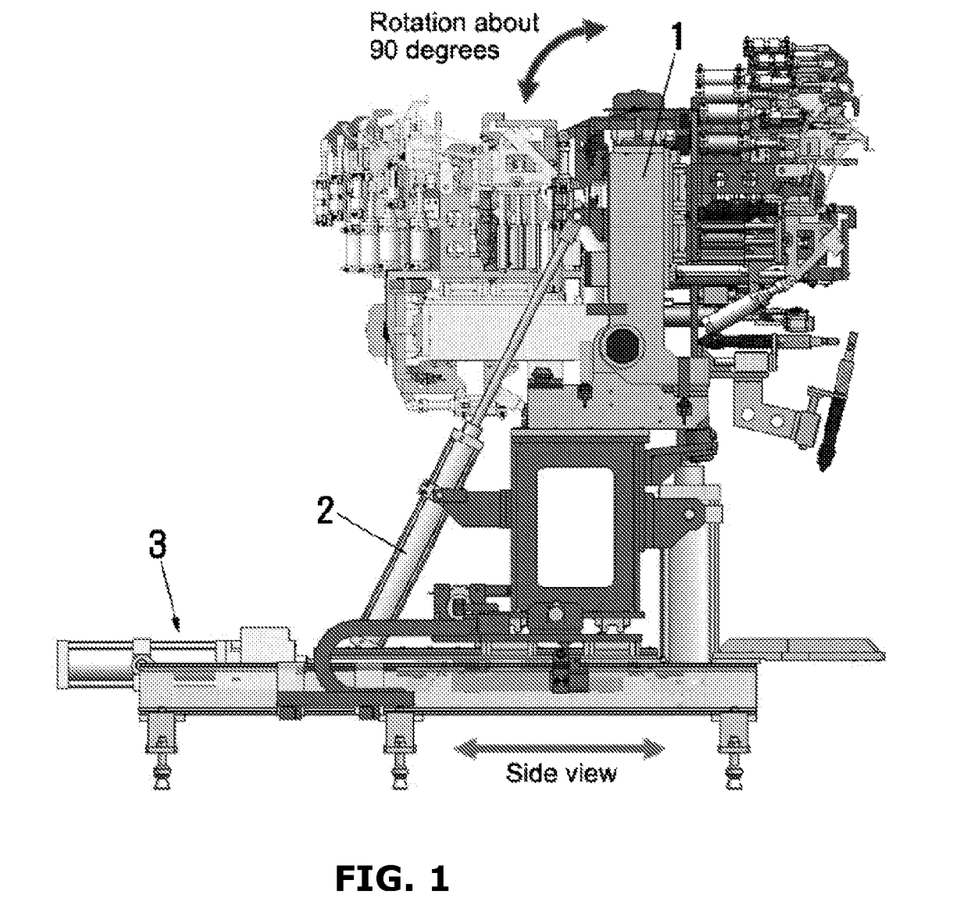
FIG. 1 is an exemplary side view showing a fender mounting jig apparatus according to a conventional art.
Figure 2:
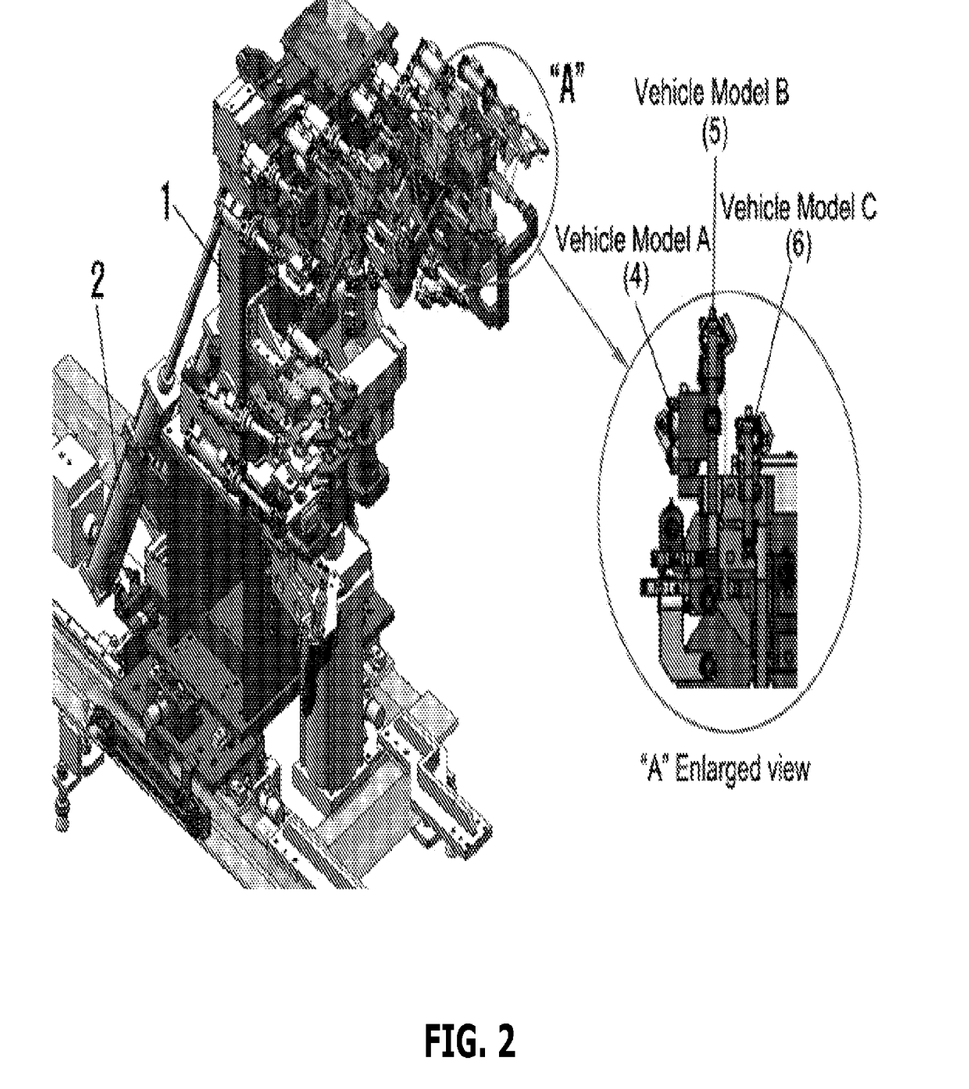
FIG. 2 is an exemplary perspective view of FIG. 1.

Generally, a worker mounts fenders on a vehicle using a fender mounting jig apparatus in a body-in-white assembling factory. The fender mounting jig apparatus, as shown in FIGS. 1 and 2, includes a fender mounting jig 1 which is mounted along with a plurality of clamp units to support and fix the fender. A cylinder 2 for jig rotation is configured to rotate the fender mounting jig 1, and a horizontal movement means 3 is configured for moving the fender mounting jig 1 in a horizontal direction and in a vertical direction.

A method for mounting a fender using the fender mounting jig apparatus typically includes loading a fender, fixing the fender, rotating the fender mounting jig 1 in a 90-degree arc by means of the jig rotating cylinder 2, making the fender approach a body-in-white (BIW), and allowing the worker to assemble the fender onto the body-in-white by means of an engagement means such as bolts.

In general, the fenders of prior model year vehicles differ in their size and shape from those of a new or current model year vehicles. Therefore, it is necessary to newly manufacture the fenders or modify a large number of clamp units to support or fix the fenders of the new vehicle to the existing fender mounting jig 1.

In order to respond to the sizes and shapes according to the models of vehicles, the conventional fender mounting jig 1, as shown in FIG. 2. The conventional fender mounting jig 1 has corresponding exclusive clamp units 4, 5, 6 according to each of the models of vehicles (e.g., model A, model B and model C of vehicles). Thus, the conventional fender mounting jig 1 can comply with variations in sizes and shapes of panels of new vehicles when new fenders of new vehicles are to be applied to the fender mounting jig 1.

However, one noted disadvantage of the conventional jig discussed above is that the conventional exclusive clamp units 4, 5, 6 cannot comply with different sizes and shapes of fenders when there are more than 4 models of vehicles using different sized or shaped fenders. In other words, although the fenders of 4 different vehicle models may be clamped with the exclusive clamp units 4, 5, 6, more than 4 different fenders cannot be accounted for. Accordingly, whenever a new fender of a new model of vehicle is assembled, a corresponding new exclusive clamp unit must be installed. As would be understood by those skilled in the art, it is difficult to install new clamp units due to the lack of space for installing surrounding the exclusive clamp unit in the jig.

Thus, the existing clamp unit must be replaced with a new clamp unit whenever there is a change in vehicle model. This results in increase in investment cost for new equipments and requires additional time for installing new equipments and parts and any exchanges needed thereof thereby also increasing manufacturing costs.

The above information disclosed in this Background section is only for enhancement of understanding of the background of the invention and therefore it may contain information that does not form the prior art that is already known in this country to a person of ordinary skill in the art.

SUMMARY OF THE DISCLOSURE

The present invention provides a common fender mounting jig apparatus for multifarious vehicle models, which installs a fixing block for each model of vehicles on each side of polygonal clamping block. The clamping block is then rotated by a driving motor and a fender panel is clamped with the fixing block fixed by an actuator, so that one common clamping unit may be used regardless of how many new fender panels of various models of vehicles are applied. Thus, the problem associated with the lack of space for installing clamping unit is resolved.

In one aspect, the present invention provides a common fender mounting jig apparatus for multifarious vehicle that includes a plurality of common clamping units for clamping fender panels of multifarious vehicles. More specifically, the common fender mounting jig uses a selectively a large number of fixing blocks processed in compliance with a shape of fender panel according to each model of vehicles. The common fender mounting jig unit also includes a clamp movement unit for moving the common clamping unit upwardly and downwardly, forwardly and backwardly. Also, a fender mounting jig may be mounted on the common fender mounting jig's upper face along with the common clamping unit and loading the fender panel clamped by the common clamping unit on a body-in-white. A jig movement unit may be provided for moving and rotating the fender mounting jig.

In a preferred embodiment, the common clamping unit may include a first clamping block and second clamping block have a polygonal shape. These first and second clamping blocks may be mounted on each face of the polygonal shape thereof along with a fixing block for each model of vehicles. The fender panel may then be clamped by turning the fender on an axis of rotation. A driving motor may also be connected to the first and second clamping blocks through the axis of rotation in order to rotate the first and second clamping blocks accordingly.

In another preferred embodiment, the common fender mounting jig apparatus may further include an actuator for pushing an operation rod into a fixing groove formed in a circumferential direction on the axis of rotation of the fixing block to fix the fixing block, and for clamping the fender panel of multifarious vehicles with the fixing block.

Advantageously, the fixing block has the same shape as the fender panel of each model of vehicles is mounted on each face of the clamping block of polygonal shape. Specifically, the clamping block may be fixed in its position by a position stopper after the clamping block is rotated, and the fixing block may be mounted on each face of the clamping block. Thus, one common clamping unit according to the present invention may be used with various fender panel shapes sizes of multifarious vehicles. That is, the present invention does not require any modification to the existing clamping unit or manufacturing of a new clamping unit when a new model of vehicle is introduced to the vehicle line.

It is understood that the term "vehicle" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more power sources, e.g., both gasoline-powered and electric-powered vehicles.

BRIEF DESCRIPTION OF THE DRAWINGS

The above and other features of the present invention will now be described in detail with reference to certain exemplary embodiments thereof illustrated the accompanying drawings which are given hereinbelow by way of illustration only, and thus are not limitative of the present invention, and wherein.

Reference numerals set forth in the Drawings includes reference to the following elements as further discussed below:

| | |
|---|---|
| 10: fender panel | 11: fender mounting jig |
| 12: common clamp unit | 13: clamp lifting member |
| 14: forward/backward clamp moving member | |
| 15: clamping main body frame | 16: first clamping block |
| 17: second clamping block | 19: housing |
| 20: housing connection bracket | 21: fixing bracket |
| 22: rotational link | 23: connection member |
| 24: actuator | 26: operational rod |
| 27: fixing block | 28: rotational axis |
| 29: fixing groove | 30: fixing pin |
| 31: body-in-white | 32: clamping cylinder |
| 33: left/right movable jig unit | |
| 34: forwardly/backwardly movable jig unit | |
| 35: upwardly/downwardly movable jig unit | |
| 36: jig rotating unit | |

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter reference will now be made in detail to various embodiments of the present invention, examples of which are illustrated in the accompanying drawings and described below. While the invention will be described in conjunction with exemplary embodiments, it will be understood that the present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

Figure 3:
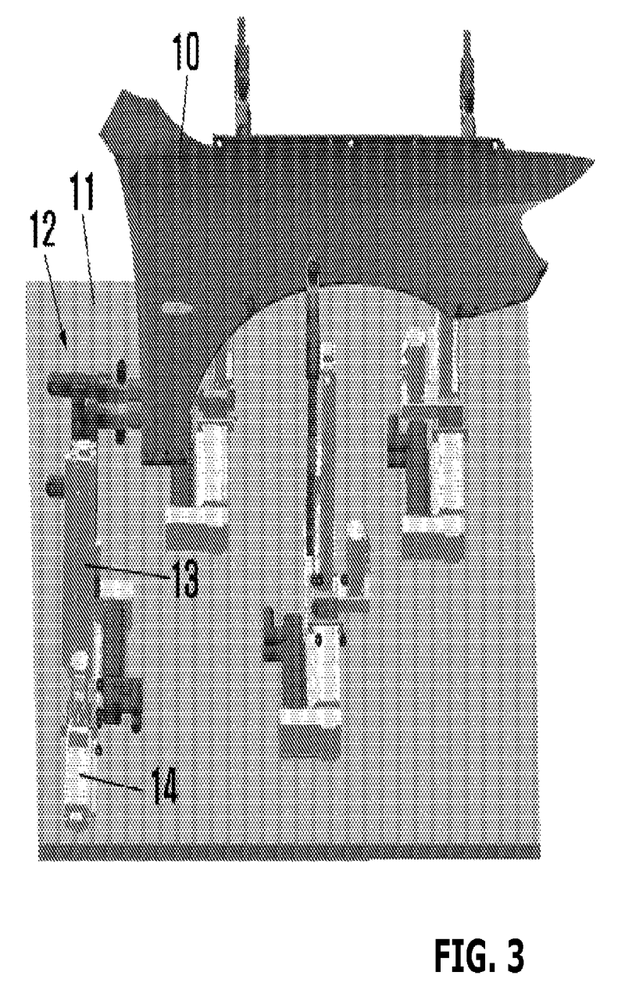
FIG. 3 is an exemplary perspective view illustrating a fender panel mounted on a common fender mounting jig apparatus according to a preferred embodiment of the present invention.
Figure 4:
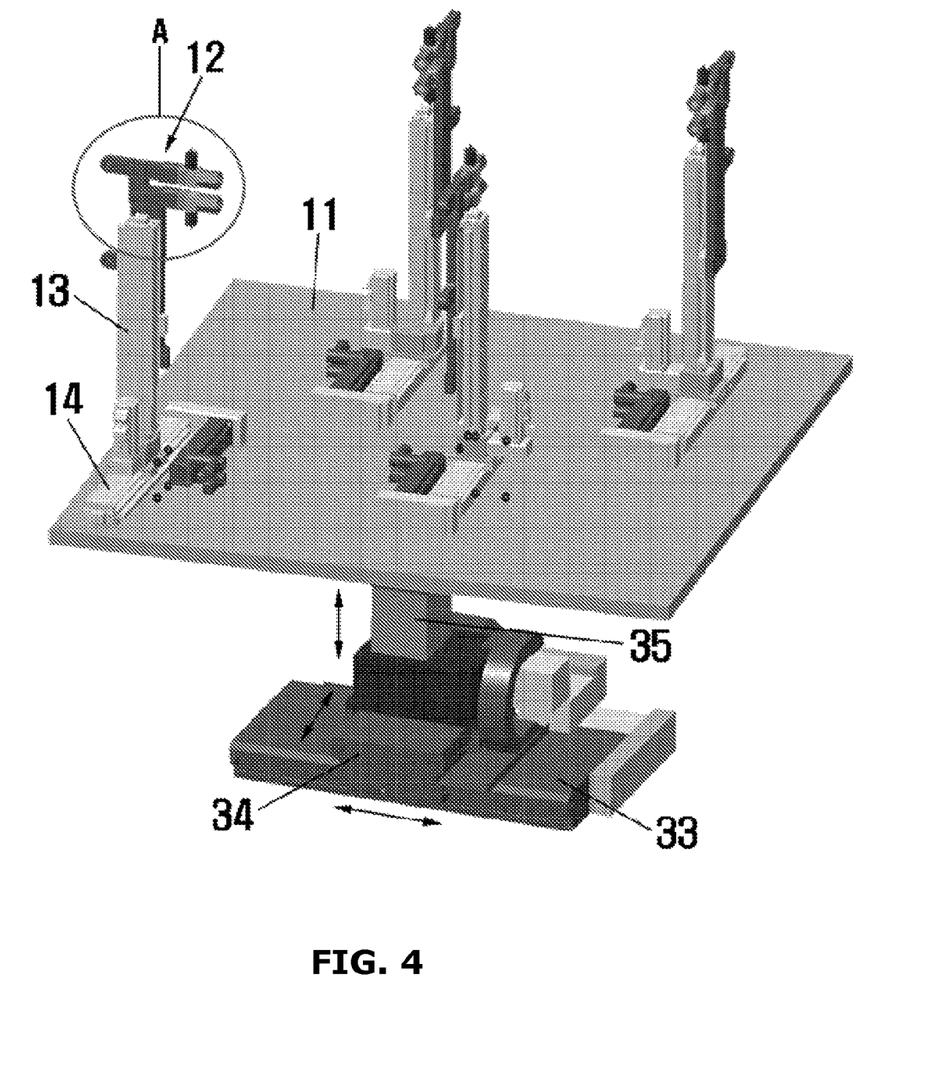
FIG. 4 is an exemplary perspective view showing the common fender mounting jig apparatus as shown in FIG. 3.
Figure 5:
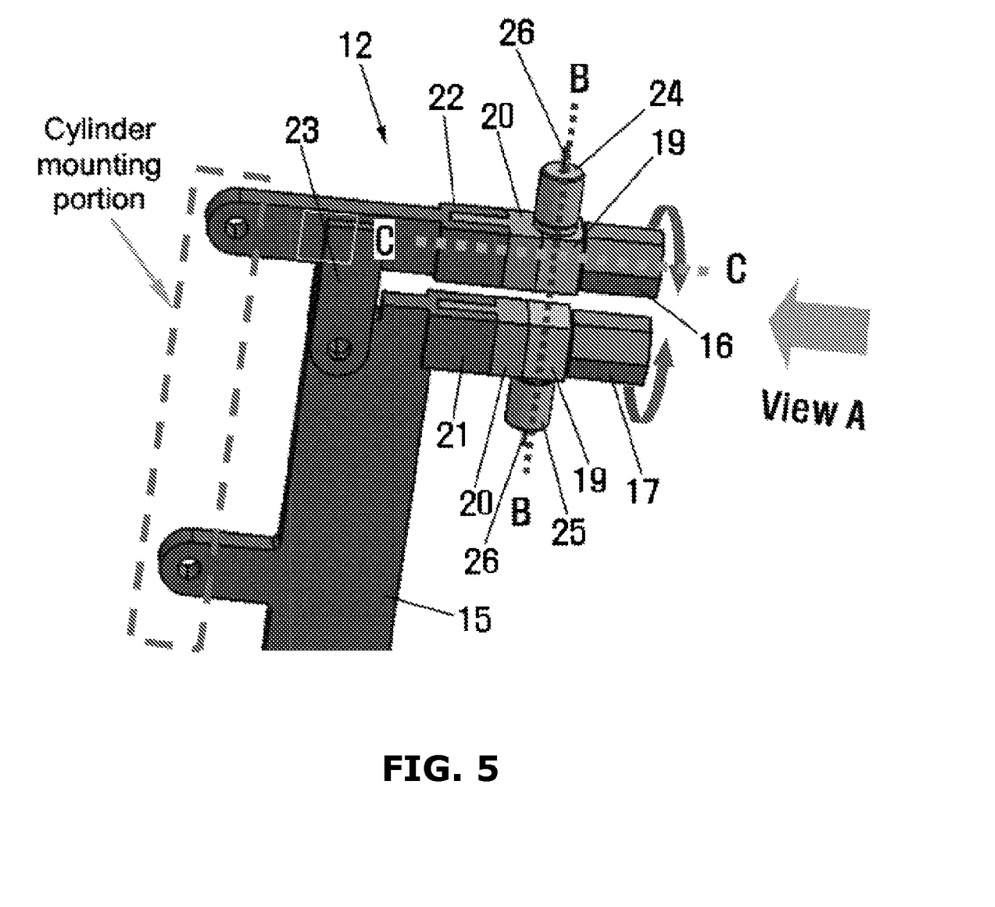
FIG. 5 is an enlarged view showing portion A shown in exemplary FIG. 4.

FIG. 3 is a perspective view showing a fender panel mounted on a common fender mounting jig apparatus according to a preferred embodiment of the present invention, FIG. 4 is a perspective view showing the common fender mounting jig apparatus as shown in FIG. 3, FIG. 5 is an enlarged view showing A portion shown in FIG. 4.

Figure 6:
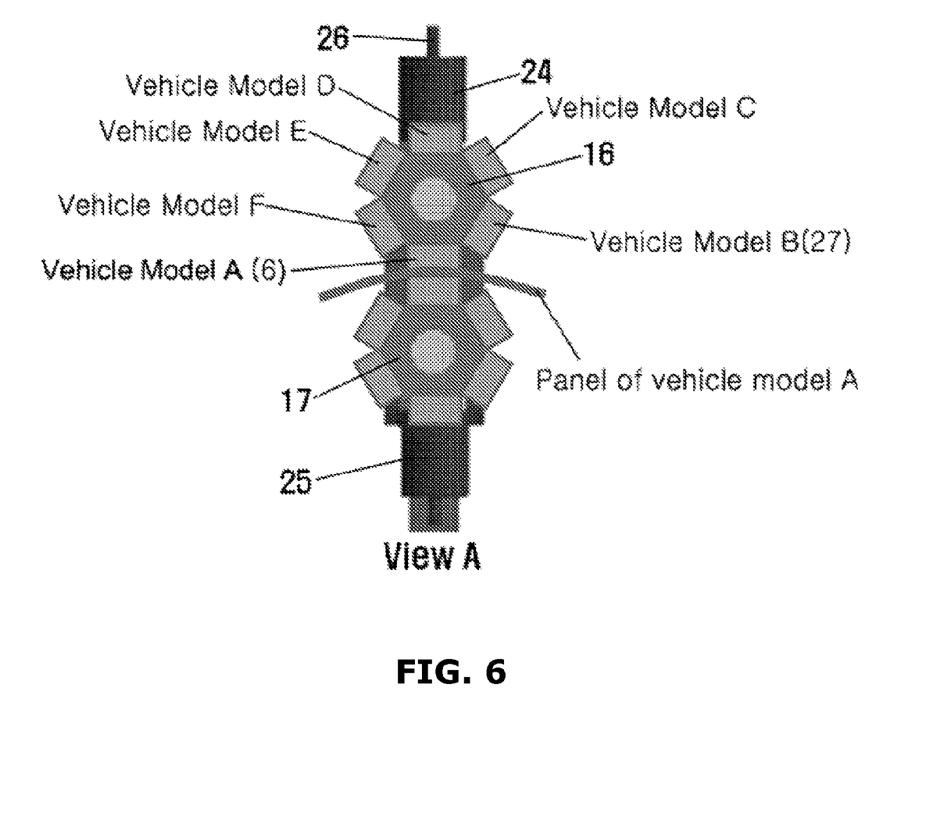
FIG. 6 is a front view of exemplary FIG. 5 viewed in an A direction indicated by an arrow.
Figure 7:
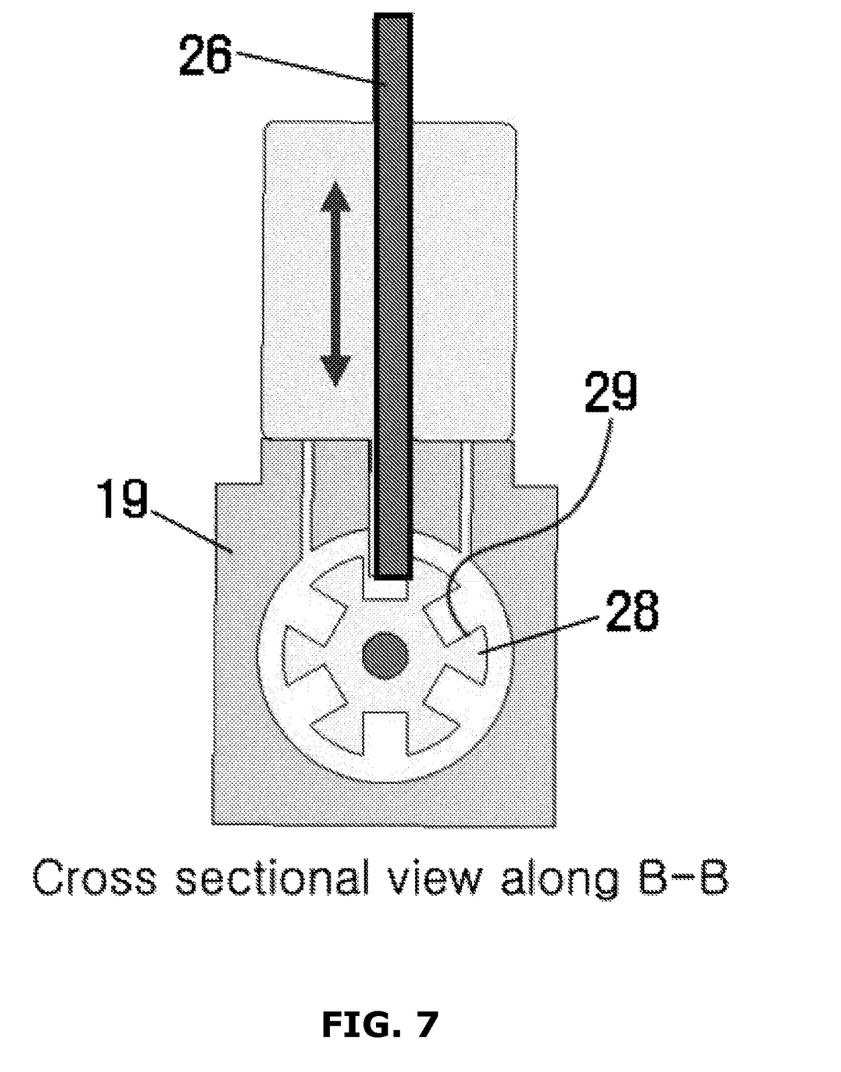
FIG. 7 is a cross sectional view taken along the dotted line B-B as shown in exemplary FIG. 5.
Figure 8:
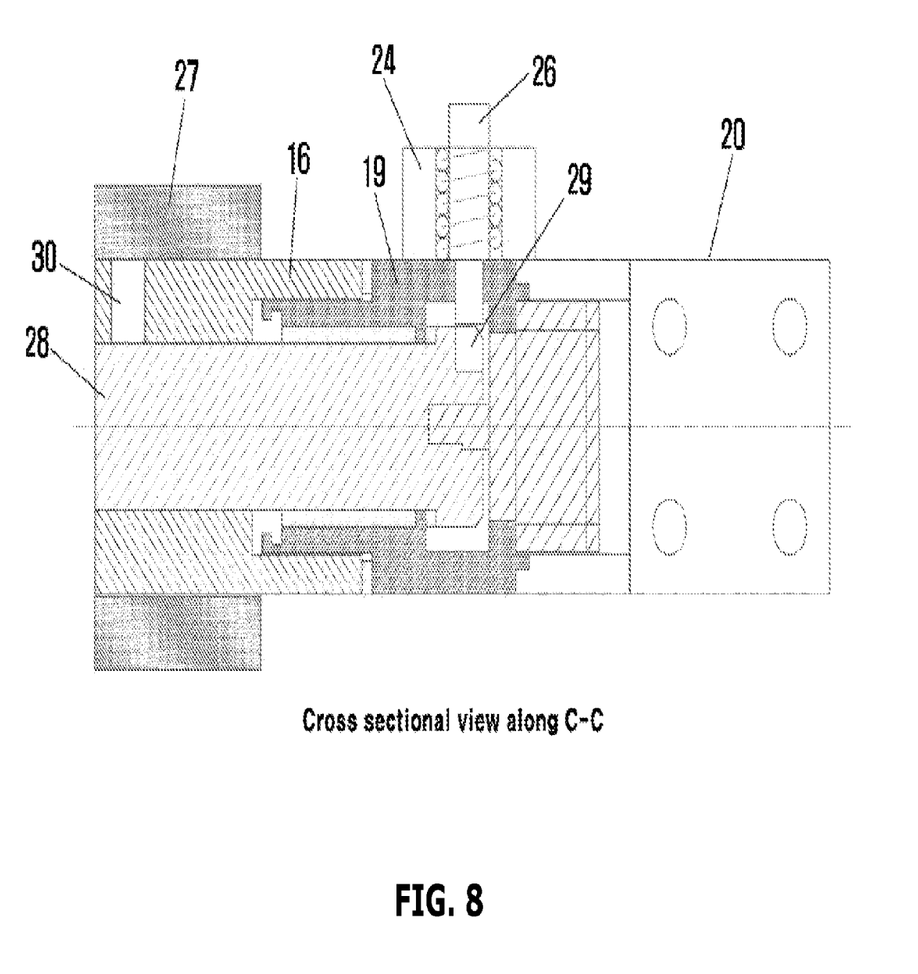
FIG. 8 is a cross sectional view taken along the dotted line C-C as shown in exemplary FIG. 5.
Figure 9:
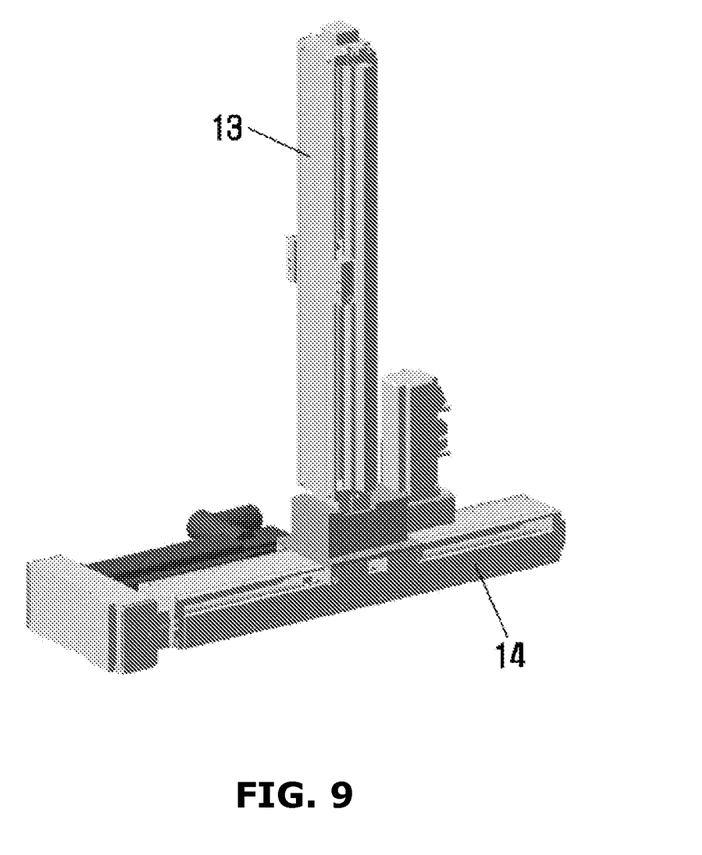
FIG. 9 is a perspective view showing a clamp movement unit shown in exemplary FIG. 4.

In addition, FIG. 6 is a front view of FIG. 5 from viewing in an A direction indicated by arrow, FIG. 7 is a cross sectional view taken along the dotted line B-B as shown in FIG. 5, FIG. 8 is a cross sectional view taken along the dotted line C-C as shown in FIG. 5, and FIG. 9 is a perspective view showing a clamp movement unit shown in FIG. 4.

The present invention relates to a common fender mounting jig apparatus to be used with multifarious vehicles that is capable of responding to multiple shapes of fender panels 10 of multifarious vehicles, e.g., 6 models of vehicles, by using the common clamp unit 12.

The common fender mounting jig apparatus for multifarious vehicles may include a common clamping unit 12 for clamping fender panels 10 of multifarious vehicles, a clamp movement unit for moving the common clamping unit 12 upwardly and downwardly, forwardly and backwardly, a fender mounting jig 11 mounted on its upper face with the common clamping unit and the clamp movement unit, and a jig movement unit and a jig rotating unit for moving and rotating the fender mounting jig.

The common clamp unit 12 may also include a clamp main body frame 15 arrayed in a vertical direction on a base plate, and a clamping block installed on an upper portion of the clamp main body frame 15 to clamp the fender panel 10.

The clamping block is formed of a first clamping block 16 arrayed at an upper portion thereof and a second clamping block 17 arrayed at a lower portion of the first clamping block 16.

The first clamping block 16 is rotatably supported by a rotation link 22. The second clamping block 17 is installed in a horizontal direction on an upper portion of the clamp main body frame 15 by means of a fixing bracket 21.

Structurally, a first end of the rotation link 22 is connected to the first clamping block 16. A first or middle portion of the rotation link 22 is coupled to the connection member 23 by means of a hinge axis, and a second portion of the rotation link 22 at a second end is connected to a piston rod of a clamping cylinder.

For example, when the piston rod of the clamping cylinder is inserted into the cylinder main body of the clamping cylinder in a lower direction, the second end of the rotation link 22 is pulled toward the lower direction, and the first end of the rotation link 22 is turned on an axis of the hinge toward an upper portion thereof, thereby making the first clamping block 16 rotate in an upper direction and releasing the clamping state.

Inversely, when the piston rod of the clamping cylinder is withdrawn from the cylinder main body of the clamping cylinder in an upper direction, the second end of the rotation link 22 is pushed upward and the first end of the rotation link 22 turns on a middle axis of the hinge in a lower direction, thereby making the first clamping block 16 rotate in a lower direction and clamping the fender panel 10.

In one embodiment of the present invention, the first and second clamping blocks 16 and 17 may have a polygonal shape, for instance, a hexagonal shape, wherein each face of the clamping blocks is flat-shaped and is mounted thereon with the fixing block 27 thereby allowing for a different fender shape for each of 6 models of vehicles. Accordingly, fixing block 27 may be interchanged by rotation according to the different shape of the fender panel 10 for each model of vehicles. Thus, there is no need to modify the existing clamping unit or additionally manufacture a new clamping unit to comply with a new fender shape when a new model of vehicle is applied.

The fixing block 27 may be made of a mono cast (MC) nylon, so that it does not scratch the fender panel 10 as would occur if other materials such as iron, etc. were used when clamping the fender panel. The MC nylon is an engineering plastic which is made by mixing nylon monomer with reactive catalysts and injecting the mixture into a mold. The mixture is then molded by a chemical change under atmospheric pressure. Accordingly, as will be understood by those skilled in the art, MC nylon has superior characteristics compared with a commonly extruded nylon product. Also, the fixing block 27 may be processed having a curved surface to meet the shape of the fender panel 10.

Each of the six fixing blocks 27 may also be fixed to each face of the clamping block by means of the fixing pin 30, and used selectively by rotating or fixing the clamping block, thereby coping with the different shapes of fenders even though a different fender panel of another model of vehicle is applied.

For example, the fixing block 27 may be formed of the first to sixth fixing blocks 27. In this example, the first fixing block 27 clamps the fender panel 10 of vehicle model, A. The second fixing block 27 clamps the fender panel 10 of vehicle model, B. The third fixing block 27 clamps the fender panel 10 of vehicle model, C. The fourth fixing block 27 clamps the fender panel 10 of vehicle model, D. The fifth fixing block 27 clamps the fender panel 10 of vehicle model, E. and the sixth fixing block 27 clamps the fender panel 10 of vehicle model, F.

At this time, in order to clamp the fender panel 10 of vehicle model A, the first fixing block 27 of the first clamping block 16 is positioned in a direction of 6 o'clock and the second fixing block 27 of the second clamping block 17 is positioned in a direction of 12 o'clock, thereby rotating the first clamping block 16 to clamp the fender panel 10.

To selectively replacing the fixing block 27, the common clamp unit 12 includes an axis of rotation 28 that is inserted into the clamping block so that the axis may be rotated together with the clamping block. Additionally, a driving motor may be connected to the axis of rotation to rotate the axis of rotation 28.

The driving motor may be selected among any small sized and accurately controllable motors, e.g., an ultrasonic motor, a Brushless Direct Current (BLDC) motor, etc., without any other restriction on its selection. When the driving motor is driven, the axis of rotation 28 rotates accordingly. Thus, the clamping block connected to the axis of rotation 28 also rotates by the same angle.

Also, the common clamp unit 12 may also include with a position stopper so that a plurality of fixing block 27 may selectively be used to conform to the shape of the fender panel 10 of each model of vehicle during the clamping the fender panel 10.

The common clamp unit 12 may also have a housing 19 that is arrayed in a concentric circle shape along a circumference of the axis of rotation 28. The driving motor is mounted in the interior of the housing 19, and a bushing, e.g., an oil-less bushing, is mounted between the housing 19 and the axis of rotation 28 so that the axis of rotation 28 may be rotated smoothly.

The position stopper may also include an actuator 24 mounted at the outside of the housing 19 and an operation rod 26 mounted at the inner side of the actuator 24 movably in an upward direction and a downward direction.

In some embodiments of the present invention, the actuator 24 may make the operation rod 26 move upwardly and downwardly by means of solenoid, pneumatic tool, and ultrasonic waves.

Additionally, an end surface of the axis of rotation 28 may be formed thereon with fixing grooves 29 at a regular interval along its circumference. These fixing grooves serve to stop the rotation of the axis of rotation 28 when the operation rod 26 moves in an upward direction or downward direction to thereby be inserted into the fixing groove 29.

The fixing grooves 29 may be formed of first to sixth fixing grooves 29 formed at positions corresponding to the fixing block 27. For example, when the first fixing groove 29 is positioned and fixed in a direction of 12 o'clock on the axis of rotation 28 by means of the operation rod 26, the first fixing block 27 is positioned in a direction of 6 o'clock on the first clamping block 16 thereby clamping the fender panel 10 of vehicle model, A.

Also, the second to sixth fixing grooves 29 may be positioned and fixed in a direction of 12 o'clock on the axis of rotation 28 by means of the operation rod 26, thereby the second to sixth fixing block 27 may be positioned in a direction of 6 o'clock on the first clamping block 16 so as to clamp each of the fender panels 10 of vehicle models B to F.

The clamping cylinder 32 may be mounted on the clamping main body frame 15 by a cylinder fixing bracket that is protruded at a middle portion of the clamping main body frame 15. Additionally, the cylinder main body of the clamping cylinder 32 is mounted on the clamping main body frame 15 by means of the cylinder fixing bracket. The piston rod of the clamping cylinder 32 may be hinge-ably coupled to a rear end of the rotation link 22 connected to the first clamping block 16 and the clamping cylinder 32 allowing the first clamping block 16 rotate toward the second clamping block 17 thereby clamping the fender panel 10.

The clamp movement unit may include a clamp lifting member 13 for moving the common clamp unit 12 upwardly and downwardly and a forward/backward clamp moving member 14 for moving the common clamp unit 12 forwardly and backwardly.

At this time, the clamp lifting member 13 may have a lifting frame and lifting guide, to guide and move the common clamp unit 12 upwardly and downwardly through the lifting guide. Here, an electric motor cylinder may also be used as a driving unit of the common clamp unit 12.

The forward/backward clamp moving member 14 may have a forwardly and backwardly moving frame and a forwardly and backwardly moving guide that are mounted on the fender mounting jig 11, to guide and move the common clamp unit 12 through the forwardly and backwardly moving guide.

Also, a jig rotating unit 36 may include a rotational shaft mounted at a lower portion of a jig, and a servo motor for rotating the rotational shaft. The jig rotating unit 36 may transfer a turning force to the rotational shaft through the servo motor to rotate the fender mounting jig 11 in a 90 degree arc.

In addition, the jig moving unit may move the fender mounting jig 11 along 3 axes, that is, the jig moving unit may include an upwardly/downwardly movable jig unit 35 for moving the fender mounting jig 11 upwardly and downwardly, a forwardly/backwardly movable jig unit 34 for moving the fender mounting jig 11 forwardly and backwardly, and a right and left jig moving unit 33 for moving the fender mounting jig 11 in a right direction and a left direction. Herein, the jig moving unit may be selected without any restrictions thereof unless it is configured to move the fender mounting jig 11 along three axes.

The operation of the common fender mounting jig apparatus for multifarious vehicles having the above-described configuration will be described as follows.

Figure 10:
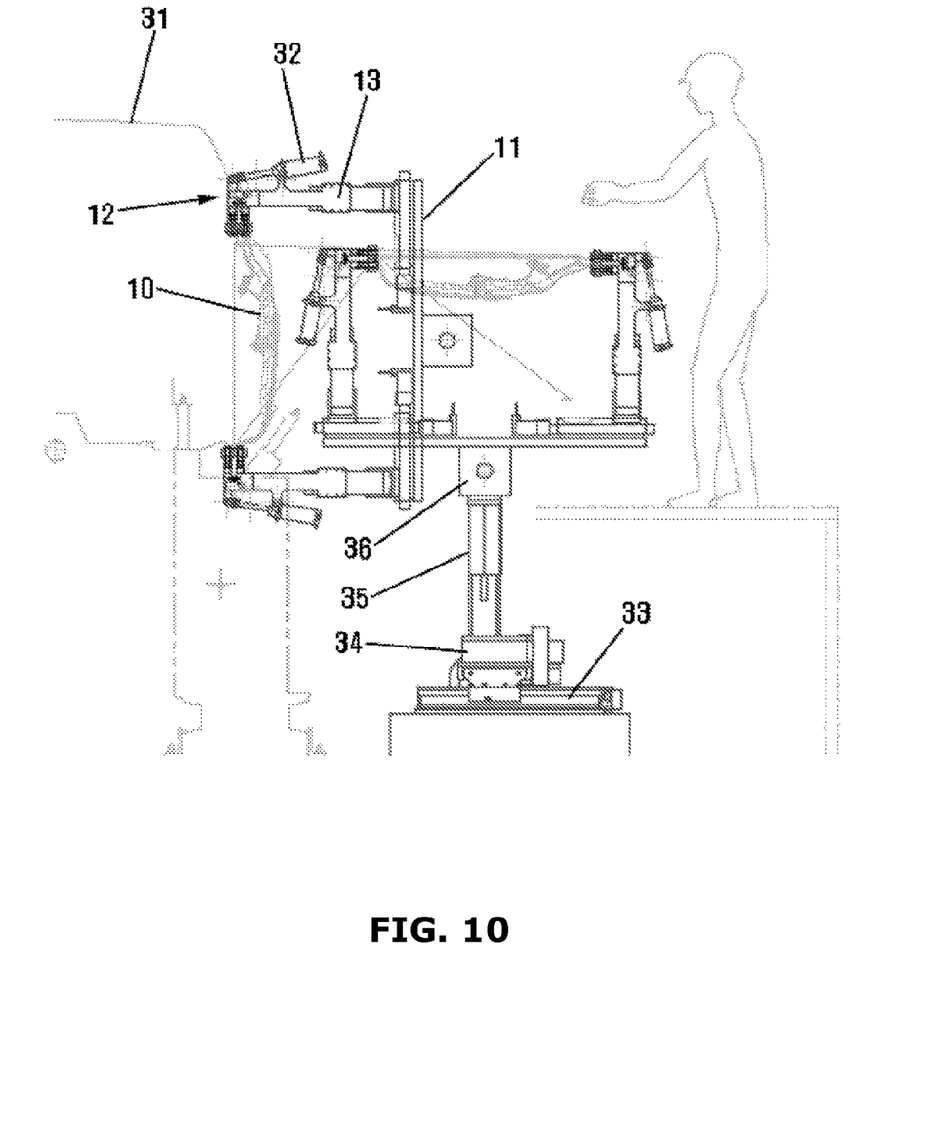
FIG. 10 is an exemplary operational view showing the operation of a common fender mounting jig apparatus for multifarious vehicles according to an exemplary embodiment of the present invention.

FIG. 10 is an operational view showing the operation of a common fender mounting jig apparatus for multifarious vehicles according to the preferred embodiment of the invention.

The common fender mounting jig apparatus for multifarious vehicles includes the common clamp unit 12 for mounting the fender panels 10 having different shapes and different sizes according to various models of vehicles on the body-in-white 31, and the clamp lifting member 13 and the forward/backward clamp moving member 14 for moving the common clamp unit 12 from the fender mounting jig 11.

By manipulating the clamp lifting member 13 and the forward/backward clamp moving member 14, the position of the common clamp unit 12 may be controlled to meet the size of the fender panel 10 associated with each model of vehicle.

Next, by rotating the polygonal clamping block of the common clamp unit 12, the fixing block 27 may be selected again at the current position thereof, or replaced with other fixing blocks having the shape corresponding to the fender panel 10 of the new model of vehicle being assembled. Thus, there is no need to modify the existing clamping unit, or manufacture a new clamping unit.

For example, when the fender panel 10 of vehicle model A is applied, the first fixing block 27, having the shape corresponding to the fender panel 10 of vehicle model A, is selected.

At this time, as the driving motor is operated and the axis of rotation rotates accordingly, the first and second clamping blocks 16 and 17 connected to the axis of rotation 28 are rotated simultaneously. When the first fixing block 27 of the first clamping block 16 is positioned in the direction of 6 o'clock, the actuator 24 is operated and the operation rod 26 is thereby inserted into and engaged with the first fixing groove 29 of the axis of rotation 28. When the first fixing block 27 of the second clamping block 17 is positioned in the direction of 12 o'clock, the actuator 24 is again operated and the operation rod 26 is thereby inserted into and engaged with the first fixing groove 29, thereby selecting the first fixing block 27.

Advantageously, when the fender panel 10 of vehicle model B is applied, the second fixing block 27 having a shape corresponding to the fender panel 10 of the vehicle model B may then be selected.

Accordingly, when other fender panels 10 of other vehicle models C, D, F and E are being applied, the third, fourth, fifth and sixth fixing blocks 27 may be selected according to the shape of the fender panels of the vehicle models C, D, E and F, respectively.

Next, if the first fixing block 27 is fixed by the operation rod 26, after the fender panel 10 of vehicle model A is loaded on the second clamp block of the common clamp unit 12, the first clamping block 16 is rotated toward the second clamping block 17 by means of the clamping cylinder 32 thereby clamping the fender panel 10 of vehicle model A.

At this time, the common clamp unit 12 may be arrayed at 2 points on an upper side of the fender panel 10, at one point on one end of the fender panel 10 and at one point on a lower side of the fender panel 10, respectively.

After an edge portion of the fender panel 10 is clamped by the common clamp unit 12, the fender mounting jig 11 may be rotated 90 degrees by means of the jig rotating unit, the fender panel 10 may then be loaded onto the body-in-white 31, and, then, the fender panel 10 may be assembled to the body-in-white 31 by means of a fastening means such as bolts, etc.

Next, the fender panel 10 is unclamped using the clamping cylinder 32. The fender mounting jig 11 then returns to its original position.

As described in the foregoing, according to the present invention, the fixing block 27 having the same shape as the fender panel 10 of each model of vehicles is mounted on each face of the polygon (for instance, a hexagon) shaped clamping block, the clamping block is rotated thereby fixing the clamping block in its position by means of the position stopper, and the fixing block 27 attached to each face of the clamping block is used selectively, thereby making the one common clamp unit 12 possible to respond to various shapes of fender panels of multifarious vehicles. Thus, eliminating the need to modify the existing clamping unit or manufacture a new clamping unit to conform to a new fender panel of new vehicle model.

The invention has been described in detail with reference to preferred embodiments thereof. However, it will be appreciated by those skilled in the art that changes may be made in these embodiments without departing from the principles and spirit of the invention, the scope of which is defined in the appended claims and their equivalents.

What is claimed is:

1. A method for clamping a panel to a vehicle using a mounting jig comprising:
    selecting a fixing block of a plurality of fixing blocks on a common clamping unit of a plurality of common clamping units, the selected fixing block processed in compliance with a shape of a panel associated with a model of vehicle, the common clamping unit allowing clamping to various panels of multifarious vehicles;
    clamping the panel utilizing the selected fixing block;
    moving, by a first movement unit, the common clamping unit upwardly/downwardly and forwardly/backwardly;
    moving and rotating the mounting jig by a second movement unit, the mounting jig mounted on its upper face with the common clamping unit and
    loading the panel clamped by the common clamping unit onto the vehicle using the mounting jig.

2. The method according to claim 1, wherein at least one of the plurality common clamping units comprises:
    a first clamping block and a second clamping block having a polygonal shape, and mounted on each face of the polygonal shape thereof with a fixing block according to which model of vehicle is being assembled, thereby clamping the fender panel; and
    a driving motor connected to the first clamping block and the second clamping block through an axis of rotation to rotate the first and second clamping blocks.

3. The method according to claim 2, forming the axis of rotation on its circumference with fixing grooves to use, selectively, the fixing blocks; and the fixing block fixed by an actuator for pushing an operation rod into the fixing groove.

4. The method according to claim 2, wherein the first and second clamping blocks are formed in a hexagon shape.

5. The method according to claim 1, wherein the first movement unit is a clamping movement unit and the second movement unit is a jig movement unit and wherein the mounting jig is a fender mounting jig.

* * * * *